United States Patent
Fukui et al.

(10) Patent No.: US 11,801,564 B2
(45) Date of Patent: Oct. 31, 2023

(54) PERFORATING APPARATUS FOR CYLINDRICAL WORKPIECE, METHOD FOR PERFORATING CYLINDRICAL WORKPIECE, METHOD FOR MANUFACTURING CYLINDRICAL PRODUCT, AND METHOD FOR INSPECTING CYLINDRICAL WORKPIECE

(71) Applicant: NGK INSULATORS, LTD., Nagoya (JP)

(72) Inventors: Toshihiro Fukui, Nagoya (JP); Hideaki Ito, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 8 days.

(21) Appl. No.: 16/821,110

(22) Filed: Mar. 17, 2020

(65) Prior Publication Data
US 2020/0306843 A1    Oct. 1, 2020

(30) Foreign Application Priority Data
Mar. 29, 2019   (JP) .................. 2019-069410

(51) Int. Cl.
*B23B 39/08*    (2006.01)
*B23Q 17/09*    (2006.01)

(52) U.S. Cl.
CPC .......... *B23B 39/08* (2013.01); *B23Q 17/0961* (2013.01); *Y10T 408/173* (2015.01)

(58) Field of Classification Search
CPC . B23B 41/003; B23B 41/006; B23B 2215/72; B23B 31/16158;
(Continued)

(56) References Cited

U.S. PATENT DOCUMENTS 2,147,800 A * 2/1939 Sadowski .............. B23Q 3/103
269/151
2,422,773 A * 6/1947 Colwill ..................... B25B 1/20
269/99
(Continued)

FOREIGN PATENT DOCUMENTS

DE   29720204 U1 * 2/1998 ............... B25B 1/20
FR   1253636 A  *  2/1961 ............... B23Q 3/06
(Continued)

OTHER PUBLICATIONS

Description FR1253636A (translation) obtained at https://worldwide.espacenet.com/ (last visited Jan. 1, 2022).*

(Continued)

*Primary Examiner* — Ryan Rufo
(74) *Attorney, Agent, or Firm* — BURR PATENT LAW, PLLC

(57) ABSTRACT

A perforating apparatus for a cylindrical workpiece, including: a cradle having a groove extending in one direction horizontally from one end to another end; a stopper provided at the one end of the groove; a drill disposed vertically above the groove and movable at least in vertical direction, having a drill bit that extends vertically; and a chuck having a pair of opposing grippers movable toward each other in a horizontal direction perpendicular to the direction in which the groove extends, and symmetrically with respect to a rotation axis of the drill bit, each of the grippers further having a pair of vertically symmetric inclined surfaces expanding upwards and downwards.

7 Claims, 7 Drawing Sheets

(58) Field of Classification Search
CPC ........... B23B 31/16179; B23B 2260/03; Y10T 408/173; Y10T 279/1291; B25B 1/20; B25B 1/2415; B23Q 3/064; B23Q 3/066; B23Q 3/06; B23Q 3/002; B23Q 3/005; B23Q 2240/007; B23C 3/122; B23C 3/124; B23C 3/002; B23C 2215/64
See application file for complete search history.

(56) References Cited

U.S. PATENT DOCUMENTS

| | | | | |
|---|---|---|---|---|
| 2,625,861 | A * | 1/1953 | Swanson | B25B 1/08 269/157 |
| 3,575,435 | A * | 4/1971 | Lemanski | B23B 31/16275 279/123 |
| 3,730,635 | A * | 5/1973 | Orendi | B23B 39/16 408/46 |
| 3,829,077 | A * | 8/1974 | Strybel | B25B 1/20 269/107 |
| 4,020,742 | A * | 5/1977 | Raymond | B23Q 16/001 409/218 |
| 4,275,872 | A * | 6/1981 | Mullis | B23Q 1/285 269/315 |
| 4,294,444 | A * | 10/1981 | Horton | B25B 1/20 269/156 |
| 4,519,592 | A * | 5/1985 | Russell | B25B 1/18 269/25 |
| 4,986,323 | A * | 1/1991 | Lemaire, Jr. | B27B 27/02 144/253.1 |
| 5,197,721 | A * | 3/1993 | Ruberg | B23Q 16/001 269/315 |
| 5,996,986 | A * | 12/1999 | Ewing | B25B 1/2468 269/282 |
| 6,641,125 | B2 * | 11/2003 | Bentley | B25B 1/2468 269/282 |
| 7,467,449 | B1 * | 12/2008 | Lee | B23B 39/06 29/26 A |
| 10,343,261 | B2 * | 7/2019 | Mack | B25B 1/2468 |
| 10,828,738 | B2 * | 11/2020 | Stokley | B23Q 3/104 |
| 2004/0076486 | A1 * | 4/2004 | Horisberger | B23Q 1/527 409/225 |
| 2009/0191368 | A1 | 7/2009 | Hironaga et al. | |
| 2010/0170081 | A1 * | 7/2010 | Kuroda | B23Q 3/066 29/559 |
| 2015/0023748 | A1 | 1/2015 | Carberry et al. | |
| 2016/0178343 | A1 * | 6/2016 | Hale | B23B 49/00 33/701 |
| 2017/0043414 | A1 | 2/2017 | Carberry et al. | |

FOREIGN PATENT DOCUMENTS

| | | | | |
|---|---|---|---|---|
| GB | | 2211118 A * | 6/1989 | ........... B25B 1/2426 |
| JP | | S59-001108 A | 1/1984 | |
| JP | | H05-131308 A | 5/1993 | |
| JP | | H05-072340 U | 10/1993 | |
| JP | | 2002-118342 A | 4/2002 | |
| JP | | 2006-239810 A | 9/2006 | |
| JP | | 2009-172518 A1 | 8/2009 | |
| JP | | 2013-132692 A | 7/2013 | |
| JP | | 2015-510455 A | 4/2015 | |

OTHER PUBLICATIONS

Description DE29720204U1 (translation) obtained at https://dialog.proquest.com/professional/cv_2183530/lookuppatent?accountid=131444 (last visited Jul. 7, 2022).*
Japanese Office Action, Japanese Application No. 2020-043543, dated Sep. 6, 2022 (21 pages).
Japanese Office Action (Application No. 2020-043543) dated Aug. 1, 2023 (with English translation) (9 pages).

* cited by examiner

PERFORATING APPARATUS FOR CYLINDRICAL WORKPIECE, METHOD FOR PERFORATING CYLINDRICAL WORKPIECE, METHOD FOR MANUFACTURING CYLINDRICAL PRODUCT, AND METHOD FOR INSPECTING CYLINDRICAL WORKPIECE

FIELD OF THE INVENTION

The present invention relates to a perforating apparatus for a cylindrical workpiece, a method for perforating a cylindrical workpiece, a method for manufacturing a cylindrical product, and a method for inspecting a cylindrical workpiece

BACKGROUND OF THE INVENTION

Generally, an exhaust system of an internal combustion engine represented by an engine is provided with a catalyst for purifying exhaust gas or a filter for purifying exhaust gas. Among carriers that support a catalyst for purifying exhaust gas and filters for purifying exhaust gas, there is a perforated honeycomb structure having a hole for inserting a sensor into itself. For example, monitoring of purification performance is conducted by inserting a sensor into a cylindrical honeycomb structure supporting a catalyst.

Japanese Patent Publication No. 2009-172518 discloses a method for manufacturing a perforated honeycomb structure having a hole portion, wherein the hole portion penetrates an outer wall and a part of partition walls from a surface of the outer wall of the honeycomb structure and a sensor or the like can be inserted into it, the method being capable of effectively preventing occurrence of chipping during perforating the hole portion, and capable of simply and inexpensively manufacturing the perforated honeycomb structure.

CITATION LIST

Patent Literature

[Patent Literature 1] Japanese Patent Publication No. 2009-172518

SUMMARY OF THE INVENTION

When perforating a cylindrical workpiece such as a honeycomb structure, a predetermined tolerance is set for the depth and position of the hole. A perforating process that satisfies a predetermined tolerance can be achieved by measuring the dimensions of the workpiece in advance with a probe of a machining center. For example, in order to satisfy the tolerance of the hole position, there is a method of measuring the positions of both ends in the diameter direction of the workpiece with a probe of the machining center, and determining the perforating position by calculation. Similarly, the tolerance of the hole depth also can be achieved by measuring the height position of the workpiece with the probe of the machining center and determining the processing start point.

Perforating process using a machining center can be performed automatically and is accurate. However, a machining center that can perform probe measurement has a high facility introduction cost. In addition, there is a problem in that it takes a long time because moving to a plurality of measurement points and measuring are repeated for the probe measurement. Furthermore, specialized knowledge is required to create an NC program for automatically performing the perforating process.

The present invention has been made in view of the above circumstances, and in one aspect, the present invention has an object to provide a perforating apparatus for a cylindrical workpiece that is capable of performing perforation with high accuracy in the depth and position of the hole without measuring the dimensions of a workpiece with a probe of a machining center. Further, in another aspect, the present invention has an object to provide a perforating method for forming a hole in a side surface of a cylindrical workpiece using the perforating apparatus. Further, in still another aspect, the present invention has an object to provide a method for manufacturing a cylindrical product comprising performing the perforating method. Further, in still another aspect, the present invention has an object to provide a method for inspecting a cylindrical workpiece in which the perforating method is performed.

As a result of intensive studies to solve the above problems, the present inventors have completed the inventions which are exemplarily shown as below.

(1)

A perforating apparatus for a cylindrical workpiece, comprising:
- a cradle having a groove extending in one direction horizontally from one end to another end;
- a stopper provided at the one end of the groove;
- a drill disposed vertically above the groove and movable at least in a vertical direction, having a drill bit that extends in the vertical direction; and
- a chuck having a pair of opposing grippers movable toward each other in a horizontal direction perpendicular to the direction in which the groove extends, and symmetrically with respect to a rotation axis of the drill bit, each of the grippers further having a pair of vertically symmetric inclined surfaces expanding upwards and downwards.

(2)

The perforating apparatus according to (1), wherein the stopper has a wall surface perpendicular to the direction in which the groove extends.

(3)

The perforating apparatus according to (1) or (2), wherein the drill is movable in the direction in which the groove extends.

(4)

The perforating apparatus according to any one of (1) to (3), comprising:
- a detector capable of detecting a point in time when the drill bit comes into contact with the workpiece by a change in a main spindle load on the drill bit; and
- a controller that can instruct the drill to perform perforation at a predetermined depth using the contact of the drill with the workpiece as a trigger.

(5)

The perforating apparatus according to any one of (1) to (4), wherein when observed from the direction in which the groove extends, the contour shape of the groove is V-shaped, U-shaped, arc-shaped, or a part of any of these shapes.

(6)

The perforating apparatus according to any one of (1) to (5), wherein when observed from a longitudinal direction of the groove, the pairs of the inclined surfaces of each of the grippers is V-shaped.

(7)

The perforating apparatus according to any one of (1) to (6), wherein the cradle is divided into two parts with the groove in between, and each part of the cradle is fixed to each grippers of the pair of the grippers.

(8)

A perforating method for forming a hole in a side surface of a cylindrical workpiece, comprising:
- a step of preparing the perforating apparatus according to any one of (1) to (7);
- a first positioning step of fitting the workpiece in the groove so that a center axis direction of the workpiece and the direction in which the groove extends coincide with each other, and so that one end of the workpiece in the center axis direction contacts the stopper;
- a second positioning step of lifting the workpiece in the vertical direction while sandwiching opposing side surfaces by moving the pair of the grippers of the chuck toward each other in a horizontal direction perpendicular to the direction in which the groove extends, and symmetrically with respect to the rotation axis of the drill bit; and
- a step of perforating the side surface of the workpiece with the drill by moving the drill vertically downwards.

(9)

The perforating method according to (8), wherein the drill is movable in the longitudinal direction of the groove, and in the step of perforating, the drill moves vertically downwards after moving a predetermined distance in the longitudinal direction of the groove.

(10)

The perforating method according to (8) or (9), wherein the perforating apparatus comprises a detector capable of detecting a point in time when the drill bit comes into contact with the workpiece by a change in a main spindle load on the drill bit and a controller that can instruct the drill to perform perforation at a predetermined depth using the contact of the drill with the workpiece as a trigger, and in the step of perforating, using a height position at a time of the contact with the workpiece as a reference, the drill performs perforation at a predetermined depth in accordance with an instruction from the controller.

(11)

A method for manufacturing a cylindrical product, comprising performing the perforating method according to any one of (8) to (10).

(12)

The method for manufacturing a cylindrical product according to (11), comprising inserting a sensor into the hole opened in the side surface of the workpiece.

(13)

A method for inspecting a cylindrical workpiece, comprising imaging the hole opened in the side surface of the workpiece using a camera having a telecentric lens after performing the perforating method according to any one of (8) to (10).

According to one embodiment of a perforating apparatus for a cylindrical workpiece of the present invention, it is possible to perform perforation with high accuracy in the depth and position of the hole without measuring the dimensions of the workpiece with a probe of a machining center. Further, according to one embodiment of a perforating apparatus for a cylindrical workpiece of the present invention, perforation of a cylindrical workpiece can be performed in a short time. Therefore, the perforating apparatus for a cylindrical workpiece according to the present invention can be suitably used for manufacturing a perforated cylindrical product such as a perforated honeycomb structure.

According to one embodiment of the method for inspecting a cylindrical workpiece of the present invention, it is possible to accurately measure the position of the hole opened in the side surface of a cylindrical workpiece in a short time.

DETAILED DESCRIPTION OF THE INVENTION

Embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

1. Perforating Apparatus

Figure 1A:
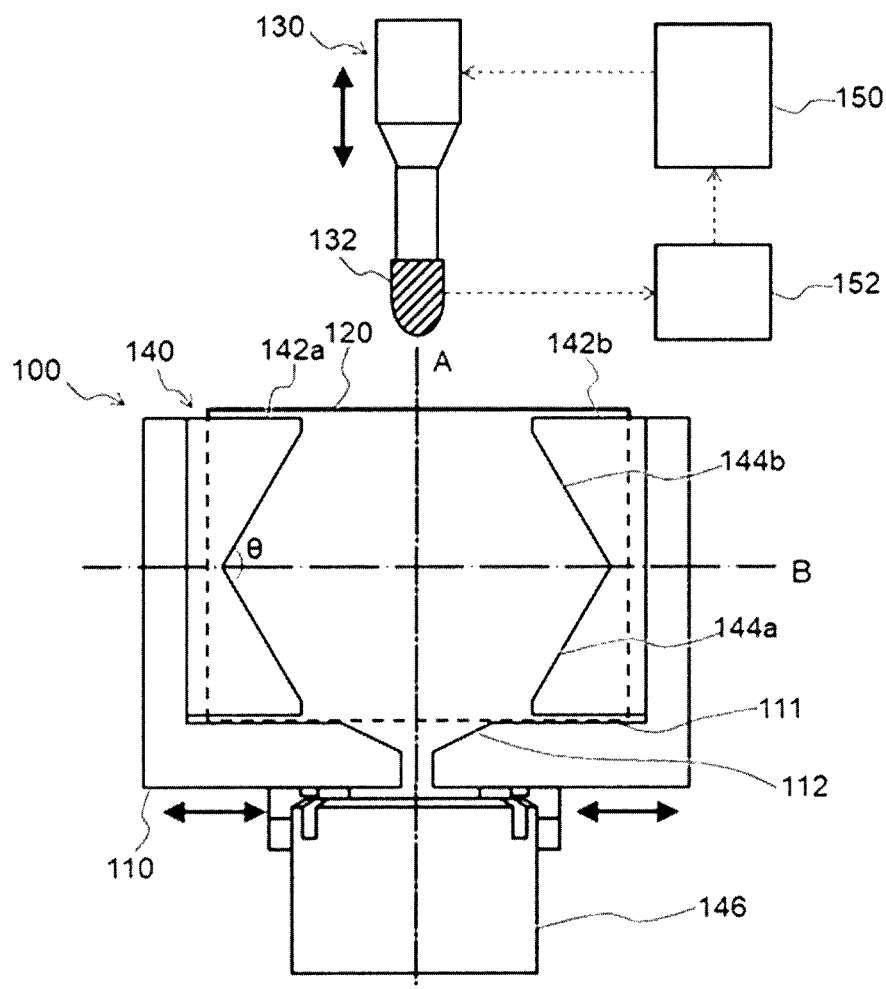
FIG. 1A is a schematic front view (drill illustrated) and FIG. 1B is a schematic plan view (drill not illustrated) according to one embodiment of a perforating apparatus for a cylindrical workpiece.
Figure 1B:
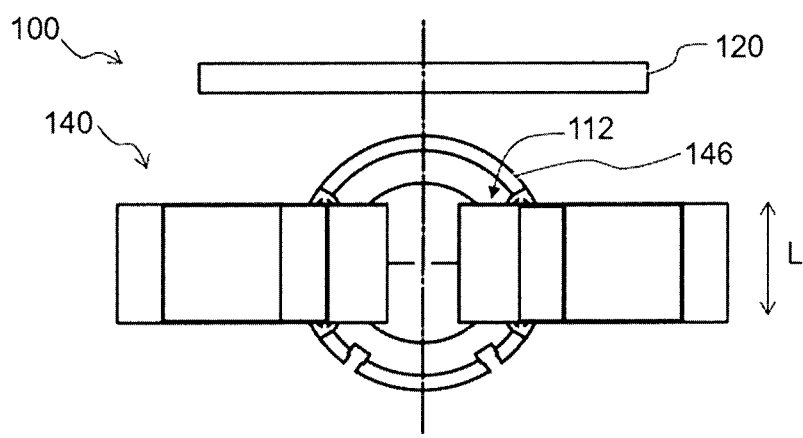

Referring now to FIG. 1, a perforating apparatus (100) for a cylindrical workpiece according to one embodiment of the present invention comprises:
- a cradle (110) having a groove (112) extending in a direction horizontally from one end to the other end;
- a stopper (120) provided at one end of the groove (112);
- a drill (130) disposed vertically above the groove (112) and movable at least in a vertical direction, having a drill bit (132) that extends in the vertical direction; and
- a chuck (140) having a pair of opposing grippers (142a, 142b) movable toward each other in a horizontal direction perpendicular to the direction in which the groove (112) extends, and symmetrically with respect to a rotation axis of the drill bit (132), each of the grippers (142a, 142b) further having a pair of vertically symmetric inclined surfaces (144a, 144b) expanding upwards and downwards.

Figure 2A:
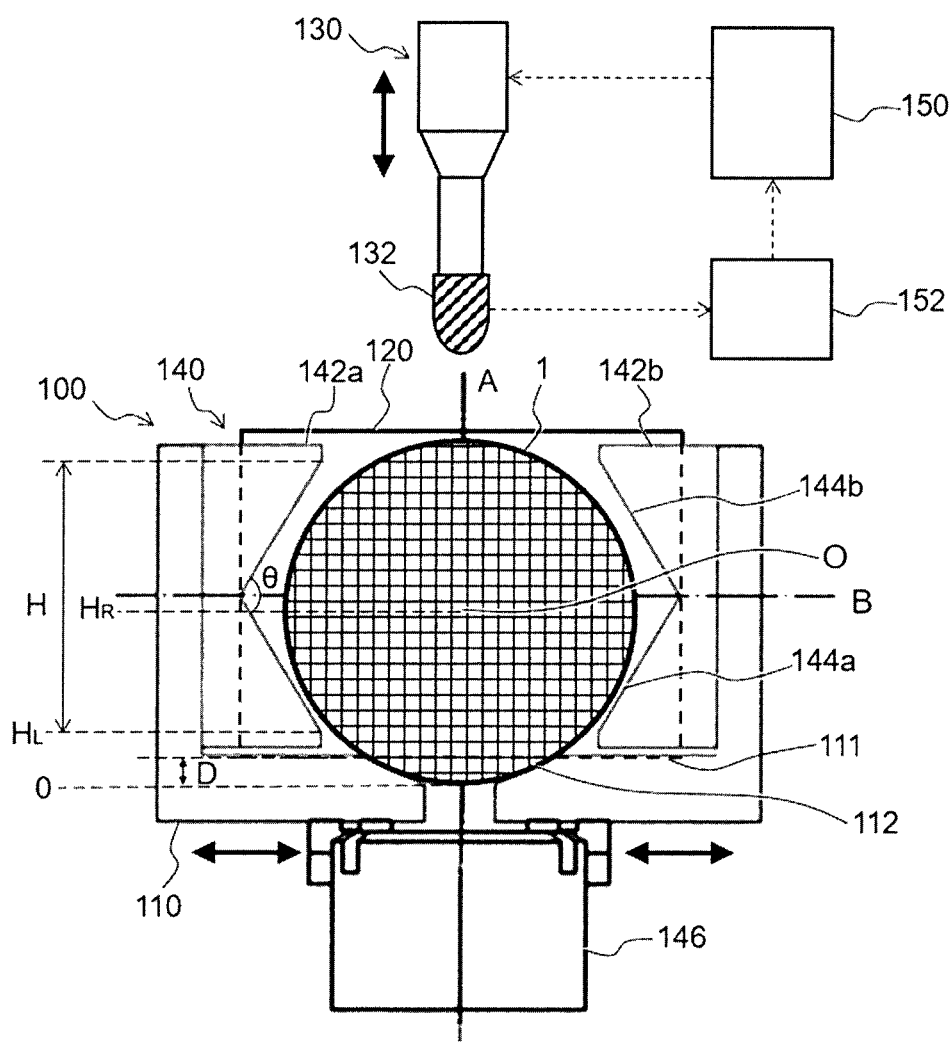
FIG. 2A is a schematic front view (drill illustrated) and FIG. 2B is a schematic plan view (drill not illustrated) of the perforating apparatus when a cylindrical workpiece is placed in the groove and pushed against the stopper.

The cylindrical workpiece (1) can be placed on the cradle (110) (see FIG. 2A). The cradle (110) has a horizontal reference surface (111) and a groove (112) recessed below the reference surface. The groove (112) extends in one horizontal direction from one end to the other end. By fitting the cylindrical workpiece (1) in the groove (112) so that the center axis direction of the cylindrical workpiece and the direction in which the groove (112) extends coincide with each other, it is easy to perform preliminary positioning in the right-left direction when placing the cylindrical workpiece (1) on the cradle (110) assuming that the perforating apparatus (100) is viewed from the front (that is the horizontal direction perpendicular to the direction in which the groove (112) extends. The same applies hereinafter.).

In one embodiment, the cradle (110) may be divided into two parts with the groove (112) in between. In this case, each part of the cradle (110) is fixed to each gripper of the pair of the grippers (142a, 142b).

In another embodiment, the cradle (110) may be constructed integrally. In this case, the pair of the grippers (142a, 142b) can be configured to be relatively movable with respect to the cradle (110). According to this embodiment, an advantage that the number of parts is reduced can be obtained.

When observed from the direction in which the groove extends, the contour shape of the groove (112) may be, for example, a broken line, a curve, or a combination of line segment(s) and curve(s). More specifically, the contour shape may be a V-shape (a kind of broken line), a U-shape (a combination of line segments and a curve), an arc shape (a kind of curved shape), or a part of any one of these shapes or the like. Among them, an arc shape corresponding to the side surface shape of the cylindrical workpiece is preferable because the cylindrical workpiece (1) can be stably positioned in the groove (112).

When fitting the cylindrical workpiece (1) in the groove (112), if the cylindrical workpiece (1) sinks excessively, afterwards, when the cylindrical workpiece (1) is sandwiched by the pair of the grippers (142), it becomes difficult to lift the cylindrical workpiece (1) from the groove (112). Therefore, the depth of the groove (112) is desirably set such that when the cylindrical workpiece (1) is fitted in the groove (112), the sinking depth of the cylindrical workpiece (1) is preferably set to 20% or less, more preferably 10% or less, and still more preferably 5% or less of the diameter of the cylindrical workpiece (1). On the other hand, when the groove (112) is too shallow, the stability when the cylindrical workpiece (1) is fitted in the groove (112) is reduced. Therefore, the depth of the groove (112) is desirably set such that when the cylindrical workpiece (1) is fitted in the groove (112), the sinking depth of the cylindrical workpiece (1) is preferably set to 0.5% or more, more preferably 1% or more, and still more preferably 1.5% or more of the diameter of the cylindrical workpiece (1). Here, the sinking depth D of the cylindrical workpiece (1) refers to the distance between the height of the reference surface (111) of the cradle (110) and the lowest point of the cylindrical workpiece (1) when the cylindrical workpiece (1) is fitted in the groove (112).

Figure 2B:
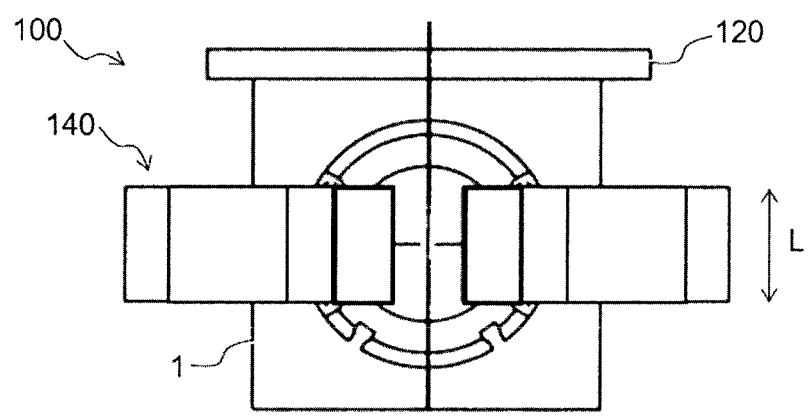

A stopper (120) is provided at one end of the groove (112). By contacting one end of the cylindrical workpiece (1) with the stopper (120), it becomes easy to perform axial positioning of the cylindrical workpiece (1) when placing the cylindrical workpiece (1) on the cradle (110) without measuring the dimensions of the workpiece with a probe (see FIG. 2B). The structure of the stopper (120) is not particularly limited as long as the effect of positioning the cylindrical workpiece (1) at a predetermined position in the center axis direction of the cylindrical workpiece (1) is obtained. Accordingly, the stopper may have a structure such as a wall, a bar, a fence or a grid, but preferably has a wall surface perpendicular to the direction in which the groove (112) extends. From the viewpoint of performing positioning stably, it is more preferable that the wall surface be set to a size and a position such that it can contact the entire bottom surface at one end of the cylindrical workpiece (1).

The drill (130) is disposed vertically above the groove (112), typically vertically above the center in the right-left direction of the groove (112), and is movable at least in the vertical direction. The drill (130) has a drill bit (132) that extends in the vertical direction. By lowering the drill (130) while rotating the drill bit (132), perforation can be performed on the upper portion of the side surface of the cylindrical workpiece (1). The drill (130) may be further configured to be movable in the direction in which the groove (112) extends. Thereby, the position of the hole in the side surface of the cylindrical workpiece (1) in the central axis direction of the cylindrical workpiece (1) can be changed. Therefore, in one embodiment, the drill (130) can perform perforation through a process of moving vertically downwards after moving a predetermined distance in the longitudinal direction of the groove.

The diameter, type, material, and rotation speed of the drill bit (132) may be appropriately selected depending on the material of the cylindrical workpiece, the size of the hole, and the like. For example, the diameter of the drill bit (132) can be 15 to 45 mm φ, and can be typically 25 to 35 mm φ. The type of the drill bit (132) can be electrodeposition, metal bond, or the like. The material of the drill bit (132) can be a cemented carbide, high speed steel, or the like. The rotation speed of the drill bit (132) can be 1200 to 10000 rpm, and can be typically 4000 to 8000 rpm.

In one embodiment, the perforating apparatus (100) comprises a controller (150), and the drill (130) can be moved and driven by instructions from the controller (150). For example, the controller (150) can moves the drill (130) to a predetermined position and give an instruction to drill a hole therefrom at a predetermined depth in the vertical direction based on the target diameter of the cylindrical workpiece (1). Such a configuration of the perforating apparatus can be realized by, for example, a servo mechanism of an NC machine tool.

However, in this embodiment, when a dimensional error occurs in the diameter of the cylindrical workpiece (1), a dimensional error in the perforation depth may occur. Therefore, in one preferred embodiment, the perforating apparatus (100) includes a detector (152) that can detect a point in time when the drill bit (132) comes into contact with the cylindrical workpiece (1) by a change in the main spindle load on the drill bit (132). In this case, the controller (150) may be configured to instruct the drill (130) to perform perforation at a predetermined depth using the contact of the drill (130) with the cylindrical workpiece (1) as a trigger. According to this embodiment, there is an advantage that a hole having a target depth can always be drilled even if a dimensional error occurs in the diameter of the cylindrical workpiece (1).

The chuck (140) has a pair of opposing grippers (142a, 142b) movable toward each other in a horizontal direction (the right-left direction) perpendicular to the direction in which the groove (112) extends, and symmetrically with respect to the rotation axis of the drill bit (132). As a chuck having such a mechanism, for example, a parallel opening/ closing type air chuck MHS2 series having a wedge-shaped cam mechanism available from SMC Corporation can be raised. For this reason, when the perforating apparatus (100) is viewed from the front, the pair of the grippers (142a, 142b) move toward each other in the right-left direction with respect to the rotation axis of the drill bit (132) as a center, and thus by simply sandwiching the cylindrical workpiece (1) between the pair of grippers (142a, 142b), the rotation axis of the drill bit (132) can be always vertically positioned above the center axis of the cylindrical workpiece (1) regardless of the diameter of the cylindrical workpiece (1). In other words, it is difficult to match the center of the cylindrical workpiece (1) in the right-left direction and the center axis of the drill bit with high accuracy by merely placing the cylindrical workpiece (1) on the cradle (110), but according to the present embodiment, the position of the workpiece in the right-left direction can be accurately determined without measuring the dimensions of the workpiece using a probe.

Figure 9:
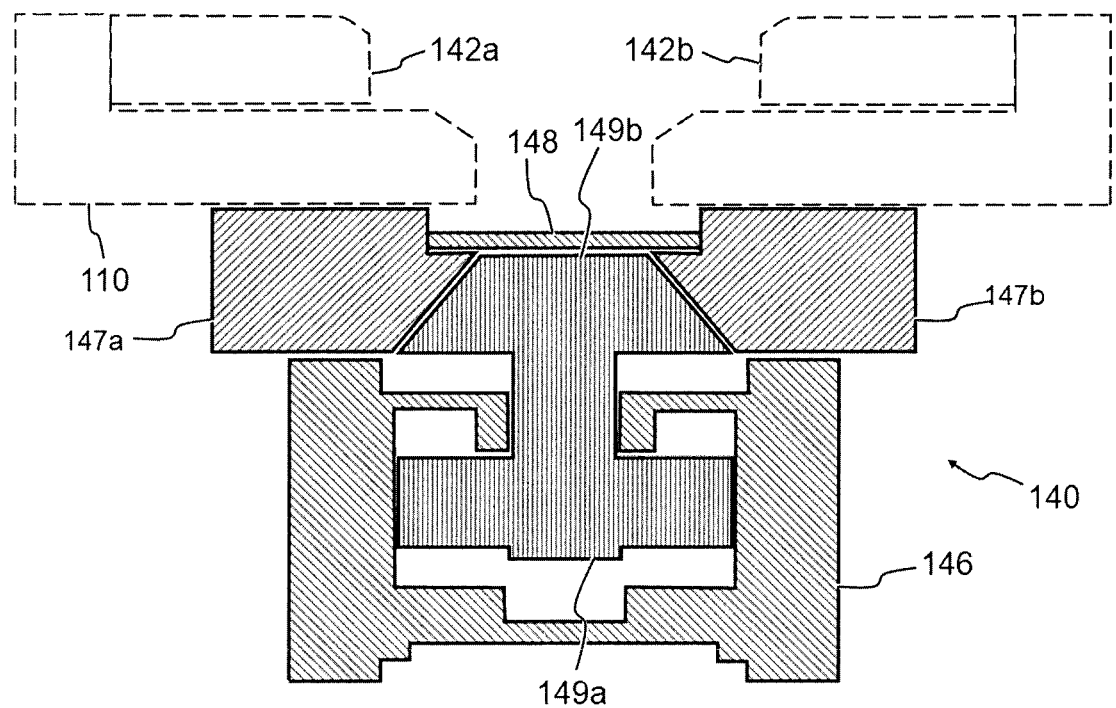
FIG. 9 is a schematic cross-sectional view for explaining one example of the operation principle of the chuck (in a state where the chuck is opened).
Figure 10:
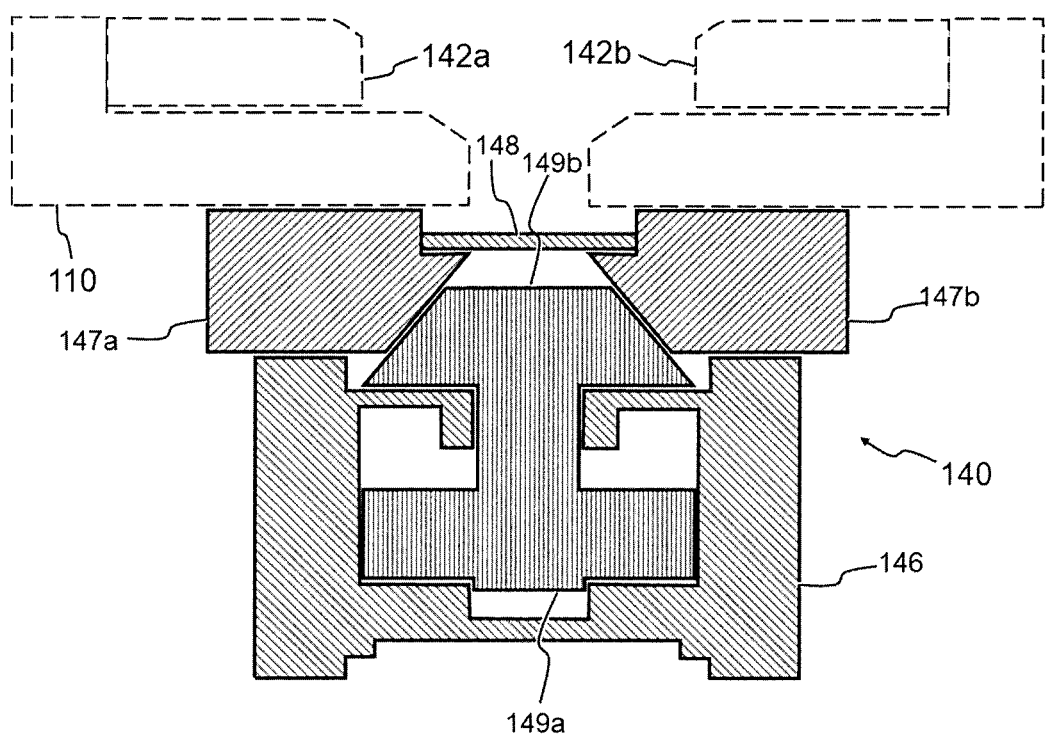
FIG. 10 is a schematic cross-sectional view for explaining one example of the operation principle of the chuck (in a state where the chuck is closed).

FIG. 9 and FIG. 10 are schematic cross-sectional views for explaining an example of the operation principle for horizontally moving the pair of the grippers (142a, 142b) symmetrically in the right-left direction by a wedge-shaped cam mechanism. The chuck (140) comprises a chuck body (146), a piston (149a) housed in the chuck body (146) and configured to be able to reciprocate in the vertical direction, an end plate 148 that restricts movement of the piston (149a), and a finger (147a, 147b) that can be opened and closed in the horizontal direction symmetrically in the right-left direction interlocked with the piston (149a).

In this embodiment, the cradle (110) is divided into two parts. Each part of the cradle (110) is fixed to each gripper of the pair of grippers (142a, 142b). In addition, each part of the cradle (110) is fixed to each part of the pair of fingers (147a, 147b), and can move interlocked with the pair of fingers (147a, 147b).

The piston (149a) has at its tip a cam (149b) capable of converting the vertical movement of the piston into a horizontal movement of the pair of fingers (147a, 147b). The cam (149b) is wedge-shaped symmetrically with respect to the central axis of the piston (149a), and when the piston (149a) rises, the pair of fingers (147a, 147b) open horizontally with the central axis of the piston (149a) as the axis of symmetry (See FIG. 9). When the piston (149a) descends, the pair of fingers (147a, 147b) closes horizontally with the central axis of the piston as the symmetry axis (see FIG. 9). Accordingly, by making the position of the center axis of the piston (149a) and the position of the rotation axis of the drill bit (132) coincide with each other in the right-left direction, the pair of grippers (142a, 142b) of the chuck (140) can move in the right-left direction symmetrically with respect to the rotation axis of the drill bit (132).

In addition, each of the pair of grippers (142a, 142b) has a pair of vertically symmetric inclined surfaces (144a, 144b) expanding upwards and downwards. According to this configuration, when moving the pair of grippers (142a, 142b) toward each other in the horizontal direction, and sandwiching the cylindrical workpiece (1) with the pair of grippers (142a, 142b), as the distance between the two decreases, the cylindrical workpiece (1) gradually climbs the lower inclined surface (144a). As the pair of grippers (142a, 142b) further move toward each other, the movement of the cylindrical workpiece (1) stops when it comes into contact with the upper inclined surface (144b), and locked while being sandwiched by the lower inclined surface (144a) and the upper inclined surface (144b). At this time, since the lower inclined surface (144a) and the upper inclined surface (144b) are vertically symmetrical, the center of the cylindrical workpiece (1) in the vertical direction is always arranged at the center of the pair of inclined surfaces (144a, 144b) in the vertical direction (on the symmetry axis B), regardless of the diameter of the cylindrical workpiece (1). Further, with this configuration, even if variation in the diameter of the cylindrical workpiece (1) happens, the dimensional error occurs only by the radius length. For this reason, there is an advantage that, even if the perforating process by the drill is automatically controlled to be performed at a predetermined depth from a predetermined position based on the target diameter of the cylindrical workpiece (1), the variation of the hole depth can be reduced to half as compared with the case where the cylindrical workpiece is placed on the cradle.

When observed from the cross-section perpendicular to the direction in which the groove extends, the contour shape of the pair of the vertically symmetric inclined surfaces (144a, 144b) expanding upwards and downwards may be a broken line, a curve, or a combination of line segment(s) and curve(s). For example, the contour shape may be a V-shape (a kind of broken line), a U-shape (a combination of line segments and a curve), an arc shape (a kind of curved shape), or a part of any one of these shapes or the like. Among them, if the inclined surfaces (144a, 144b) are V-shaped, they are always in line contact or point contact with the cylindrical workpiece (1), so that the resistance to the movement of the cylindrical workpiece (1) is small, and the pair of the grippers are easy to manufacture, and thus preferable.

In cases where the contour shape of the pair of inclined surfaces (144a, 144b) is V-shaped, if the interior angle θ of the V-shaped apex is too large, when the cylindrical workpiece (1) is held by the pair of the grippers (142a, 142b), it becomes difficult to lift the cylindrical workpiece (1) from the groove (112). Therefore, the interior angle θ is preferably 170° or less, more preferably 150° or less, and even more preferably 130° or less. However, as the internal angle θ decreases, the size of the perforating apparatus (100) tends to increase in the right-left direction of FIG. 1A. Therefore, the internal angle θ is preferably 50° or more, more preferably 70° or more, and even more preferably 90° or more.

The length L of the pair of inclined surfaces (144a, 144b) in the extending direction of the groove (112) is set preferably 10% or more, more preferably 20% or more, even more preferably 30% or more with respect to the axial length of the cylindrical workpiece (1) so that the cylindrical workpiece (1) can be stably held. Further, the length of the pair of inclined surfaces (144a, 144b) in the extending direction of the groove (112) is set preferably 100% or less, more preferably 80% or less, and still more preferably 60% or less with respect to the axial length of the cylindrical workpiece (1) from the viewpoint of suppressing the manufacturing cost of the perforating apparatus.

The symmetry axis B of the pair of inclined surfaces (144a, 144b) is preferably set at a position higher than the center axis O of the cylindrical workpiece (1) when it is fitted in the groove (112), so that when the cylindrical workpiece (1) is sandwiched by the pair of grippers (142a, 142b), the cylindrical workpiece (1) is lifted from the groove (112) more easily.

The lower end of the lower inclined surface (144a) is preferably set to be installed at a height position that makes it easier to lift the cylindrical workpiece (1) when the cylindrical workpiece (1) fitted in the groove (112) is sandwiched by the pair of grippers (142a, 142b). Particularly, assuming that the height position of the center axis of the cylindrical workpiece (1) is $H_R$ and the height position of the lower end of the cylindrical workpiece (1) fitted in the groove (112) is 0, the height position $H_L$ of the lower end of the inclined surface (144a) is preferably above the reference surface (111) of the cradle (110), and preferably $H_L<H_R$, more preferably $H_L \leq 4/5 H_R$, still more preferably $H_L \leq 3/5 H_R$, and most preferably $H_L \leq 2/5 H_R$.

If the height H in the vertical direction with respect to the pair of the inclined surfaces (144a, 144b) is too short, when the cylindrical workpiece (1) is sandwiched by the pair of the grippers (142a, 142b), it becomes difficult to lift the cylindrical workpiece (1) from the groove (112). Therefore, the lower limit of the height H is preferably 0.5 times or more, more preferably 0.7 times or more, and still more preferably 0.9 times or more as long as the diameter of the cylindrical workpiece (1). Thereby, the stability when the cylindrical workpiece (1) is sandwiched by the pair of grip portions (142a, 142b) is also improved. On the other hand, if the height H is too long, the lifting amount of the cylindrical workpiece (1) becomes unnecessarily large, and the perforating apparatus also becomes unnecessarily large in the vertical direction. Therefore, the upper limit of the height H is preferably 1.5 times or less, more preferably 1.2 times or less, and still more preferably 1.0 times or less as long as the diameter of the cylindrical workpiece (1).

2. Cylindrical Workpiece

The material and structure of the cylindrical workpiece (1) are not particularly limited. For example, the cylindrical workpiece (1) can be made of ceramic, plastic, or metal. Examples of the ceramic include, but are not limited to, cordierite, mullite, zircon, aluminum titanate, silicon carbide, silicon nitride, zirconia, spinel, indialite, sapphirine, corundum, and titania. Examples of the metals include, but are not limited to, copper, aluminum, iron, nickel, silicon, and the like. Examples of the plastic include, but are not limited to, thermoplastic resins such as vinyl resin, polystyrene resin, polyethylene, polypropylene, polyacetal, acrylic resin, polycarbonate, polyamide, polyethylene terephthalate, and fluorine resin, and thermosetting resins such as phenol resins, epoxy resins, melamine resins, urea resins, unsaturated polyester resins, alkyd resins, and polyurethanes. The cylindrical workpiece (1) may comprise one or a combination of two or more of the above, and furthermore, one or more materials other than the above-described materials may be blended appropriately.

Figure 4:
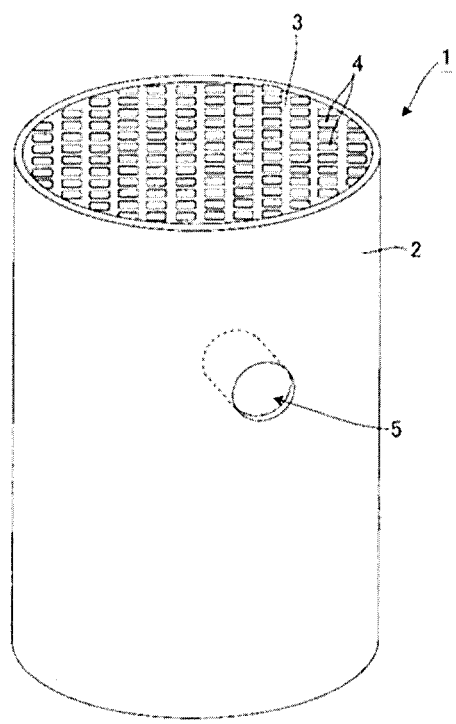
FIG. 4 is a schematic perspective view of an example of a cylindrical workpiece after perforation.

FIG. 4 schematically shows a perspective view according to one embodiment of the cylindrical workpiece (1) made of ceramic after performing perforation. The illustrated cylindrical workpiece (1) comprises a side surface (2) and a honeycomb structure having a plurality of cells (4) disposed inside the side surface (2) and forming flow paths through one end face to the other end face. The cells (4) can be defined by porous partition walls (3). The side surface (2) has a bottomed hole (5) opened toward the central axis.

The shape of the cells in a cross section orthogonal to the cell extending direction (height direction) is not limited, but is preferably a quadrangle, a hexagon, an octagon, or a combination thereof. Among these, square and hexagon are preferred. By setting the cell shape in this way, when a fired product of a honeycomb formed body is used as a catalyst carrier or a filter, the pressure loss when flowing exhaust gas is reduced, and the purification performance is excellent.

3. Method for Perforating

According to one embodiment of the present invention, there is provided a perforating method for forming a hole in a side surface of a cylindrical workpiece.

The method comprises:
a step of preparing the above- described perforating apparatus (100);

a first positioning step of fitting the cylindrical workpiece (1) in the groove (112) so that a center axis direction of the cylindrical workpiece (1) and the direction in which the groove extends coincide with each other, and so that one end of the cylindrical workpiece (1) in the center axis direction contacts the stopper (120);

a second positioning step of lifting the cylindrical workpiece (1) in the vertical direction while sandwiching opposing side surfaces, by moving the pair of the grippers (142a, 142b) of the chuck (140) toward each other in a horizontal direction (that is, in the "right-left direction") perpendicular to the direction in which the groove extends, and symmetrically with respect to the rotation axis of the drill bit (132); and a step of perforating the side surface of the workpiece with the drill (130) by moving the drill (130) vertically downwards.

By carrying out the first positioning step, the positioning of the center axis of the cylindrical workpiece (1) when the cylindrical workpiece is fitted on the cradle (110) can be easily conducted. Another advantage is that preliminary positioning in the right-left direction can be easily performed. Specific embodiments of the perforating apparatus (100) when carrying out the first positioning step is the same as that already described in the description of perforating apparatus, and thus will be omitted.

FIG. 2 shows a state in which the first positioning step has been completed. The first positioning step may be performed manually, or may be performed automatically by gripping with a robot arm (not illustrated). For example, the robot arm can be controlled by an NC device, and can be configured to be able to move in the X-axis direction, the Y-axis direction, and the Z-axis direction, and to be rotatable about the axis direction of the arm as the axis of rotation. Further, the robot arm may be configured to have gripping claws, so that the cylindrical workpiece can be gripped and released by opening and closing the gripping claws.

Figure 3A:
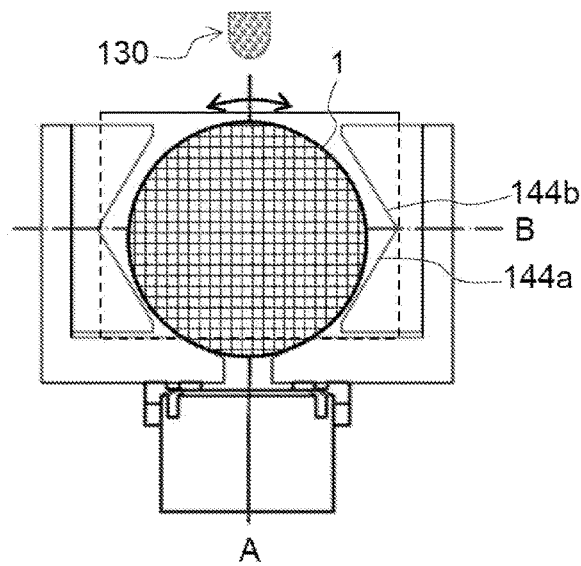
FIG. 3A, FIG. 3B, FIG. 3C and FIG. 3D are a schematic view showing a procedure for perforating the side surface of the cylindrical workpiece placed on the perforating apparatus.

In the first positioning step, a step of rotating the cylindrical workpiece (1) about its central axis can be additionally performed (see FIG. 3A). For example, by rotating the cylindrical workpiece (1) about its central axis, the direction of the cross-sectional shape of the cell can be adjusted to a predetermined direction. As an example, when the cross-sectional shape of the cell is a square, the cylindrical workpiece can be rotated so that one side of the cell is horizontal when the cylindrical workpiece is fitted in the groove. In this way, by controlling the cell direction in advance, the direction of the cell with respect to the depth direction of the hole becomes constant, so that it is possible to perform perforating operation with excellent quality stability.

Figure 3B:
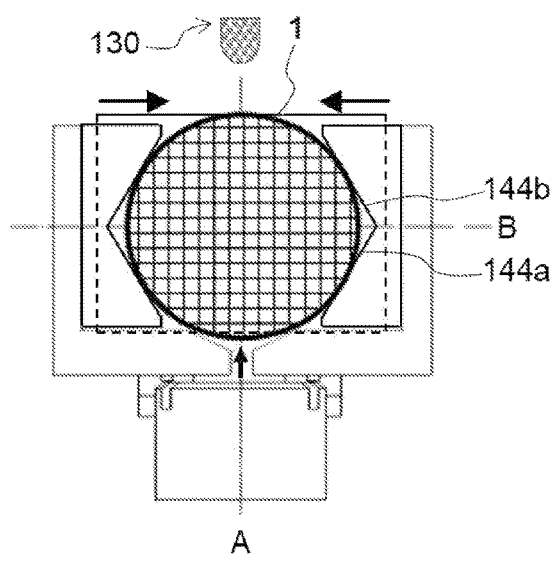

FIG. 3B shows a state in which the second positioning step has been completed. By carrying out the second positioning step, the workpiece can be positioned in the right-left direction with high accuracy without measuring the dimensions of the workpiece with a probe. Further, the center of the cylindrical workpiece (1) in the vertical direction is always arranged at the center of the pair of inclined surfaces (144a, 144b) in the vertical direction (on the symmetry axis B), regardless of the diameter of the cylindrical workpiece (1). Specific embodiments of the perforating apparatus (100) when carrying out the second positioning step is the same as that already described in the description of perforating apparatus, and thus will be omitted.

Figure 7:
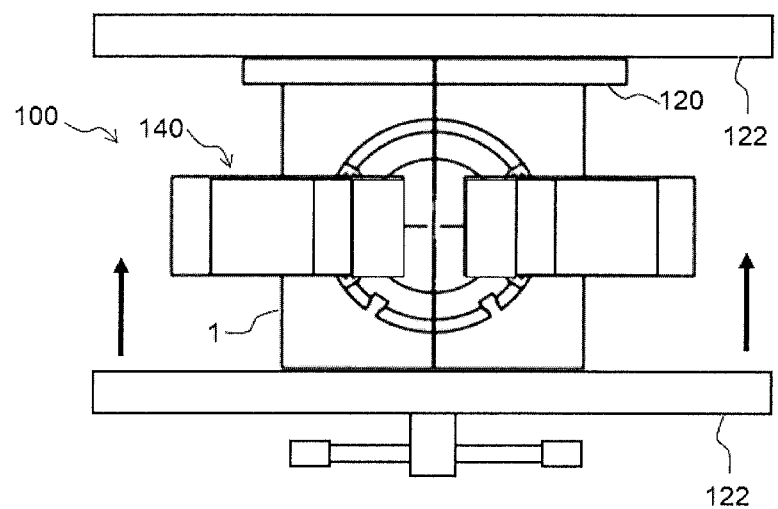
FIG. 7 is a schematic plan view for explaining a method of sandwiching a cylindrical workpiece with a vise.

After the second positioning step is completed, as shown in FIG. 7, both bottom surfaces of the cylindrical workpiece (1) may be additionally clamped with a vise (122) in the direction in which the groove extends (the direction of the arrow in the figure). In this way, the movement of the cylindrical workpiece (1) in the direction in which the groove extends is restricted, so that the cylindrical workpiece (1) is firmly fixed. In this way, the next step of perforating can be performed more stably.

Figure 3C:
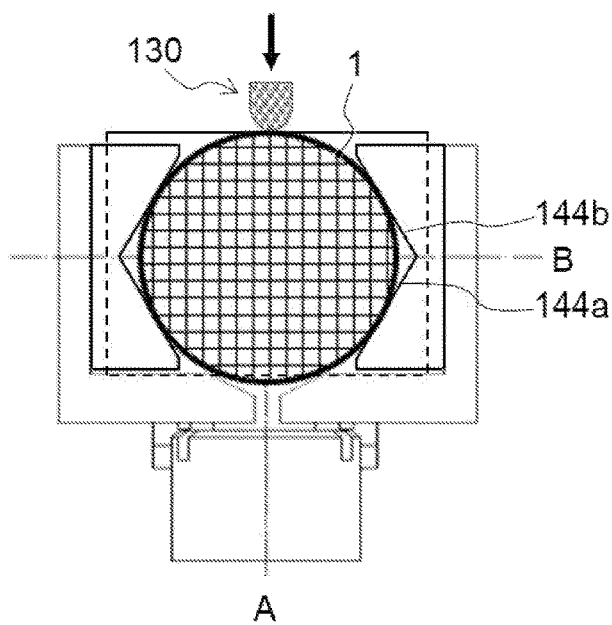

FIG. 3C shows a state where the drill (130) comes into contact with the cylindrical work (1) in the step of perforating the side surface of the workpiece with the drill (130) by moving the drill (130) vertically downwards. In one embodiment, the perforating apparatus comprises a detector capable of detecting a point in time when the drill bit comes into contact with the workpiece by a change in a main spindle load on the drill bit and a controller that can instruct the drill to perform perforation at a predetermined depth using the contact of the drill with the workpiece as a trigger. In this case, in the step of perforating, using the height position at the time of the contact with the workpiece as a reference, the drill can be configured to perform perforation at a predetermined depth in accordance with an instruction from the controller. For example, the controller can be configured in the way that, when the controller (150) receives from the detector (152) a signal indicating that the main spindle load on the drill bit (132) has changed due to the contact of the drill bit (132) with the cylindrical workpiece, using the height position at the time of the contact with the workpiece as a reference, the controller (150) transmit a signal for instructing performing perforation at a predetermined depth to the drill (130). According to this embodiment, there is an advantage that a hole having a target depth can always be drilled even if a dimensional error occurs in the diameter of the cylindrical workpiece (1). The drilling depth is not particularly limited, but can be generally equal to or less than the diameter of the cylindrical workpiece, and typically equal to or less than the radius of the cylindrical workpiece. Other specific embodiment of the perforating apparatus (100) when carrying out the step of perforating is the same as that already described in the description of perforating apparatus, and thus will be omitted.

Figure 3D:
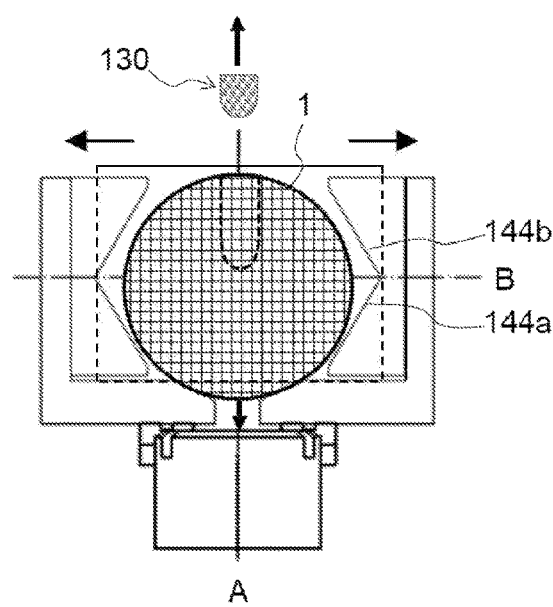

After performing the step of perforating the side surface of the cylindrical workpiece (1), the drill (130) is pulled out of the cylindrical workpiece (1) by moving vertically upwards. Next, by opening the pair of grippers (142a, 142b) of the chuck (140) in the right-left direction, the cylindrical workpiece (1) slides down from the lower Inclined surface (144a) and fits in the groove (112) again (See FIG. 3D). Thereafter, the cylindrical workpiece (1) can be taken out of the perforating apparatus (100).

4. Method for Manufacturing Cylindrical Product

According to one embodiment of the present invention, there is provided a method for manufacturing a cylindrical product, which comprises performing the above-described perforating apparatus. There are no particular restrictions on the use of the cylindrical product. For example, when the cylindrical product has a honeycomb structure, it can be used as a heat exchanger, a catalyst carrier, and the like in addition to filters such as a diesel particulate filter (DPF) and a gasoline particulate filter (GPF). When used as a catalyst carrier, the cylindrical product can carry one or more catalysts such as a three-way catalyst, an SCR catalyst, and an oxidation catalyst. For example, a sensor can be inserted into the hole opened in the side surface of the cylindrical workpiece by performing the method for perforating. Examples of the sensors include, but are not limited to, oxygen sensors, NOx sensors, air fuel ratio sensors, temperature sensors, pressure sensors, and particulate matter sensors.

5. Method for Inspecting Cylindrical Workpiece

Figure 5:
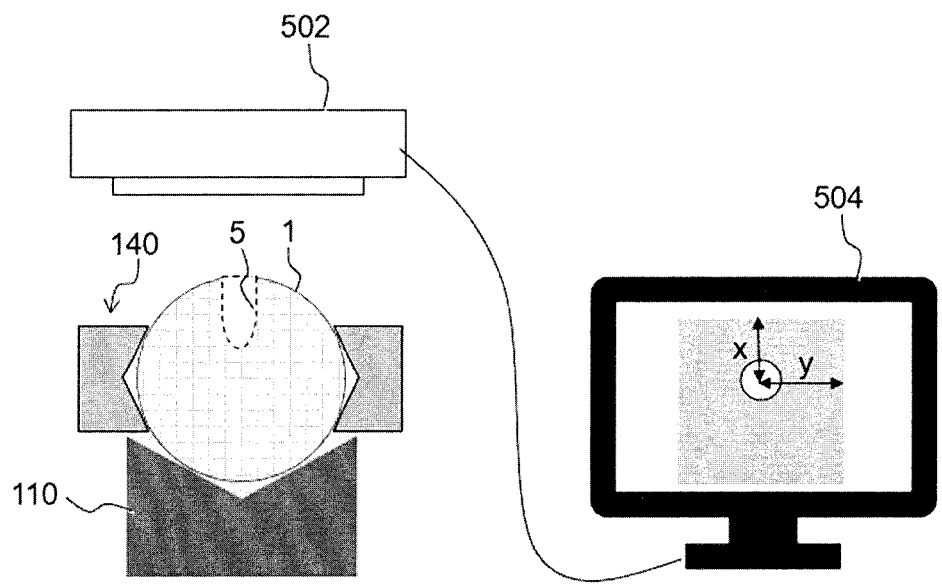
FIG. 5 is a schematic view for explaining a method of inspecting the hole opened in the side surface of a cylindrical workpiece using a camera having a telecentric lens.

According to one embodiment of the present invention, there is provided a method for inspecting a cylindrical workpiece, comprising imaging the hole opened in the side surface of the workpiece using a camera (typically a digital video camera) having a telecentric lens after performing the above-described perforating method. According to the inspection method, since distortion based on the three-dimensional shape of the imaged cylindrical work does not appear, it is possible to accurately inspect one or more inspection items such as the position, shape, and size of the hole on the monitor. There is no particular limitation on the timing of the inspection. For example, after perforating process, when the cylindrical workpiece (1) is being sandwiched by the chuck (140), the camera (502) having a telecentric lens can image the hole (5) opened in the side surface of the cylindrical workpiece (1) from vertically above (see FIG. 5). According to this embodiment, the hole can be inspected when it is opened in the vertical direction from the top of the side surface of the cylindrical workpiece, so that the position reference of the hole is clear, and the inspection accuracy can be improved.

At this time, information such as the diameter and length of the imaged cylindrical workpiece, the position, size, and length of the hole may be automatically calculated based on the pixel position. Then, as the result of calculation, the side surface of the cylindrical workpiece including the hole may be displayed on a two-dimensional monitor with the position and size of the hole and even the diameter of the cylindrical workpiece superimposed. Thereby, the inspection time can be shortened.

Figure 6:
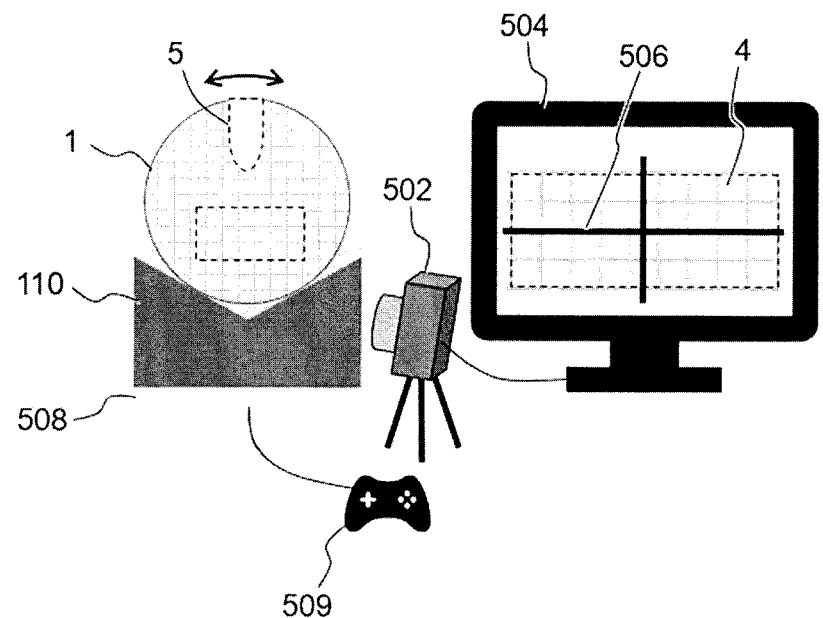
FIG. 6 is a schematic view for explaining a method of clarifying a position reference of the hole of a cylindrical workpiece using a camera having a telecentric lens.

When the hole of the cylindrical workpiece is inspected after releasing the cylindrical workpiece from the chuck after the perforating process, it is preferable that the position reference of the hole (5) be clarified in advance by adjusting while imaging the direction of the cell with a camera (typically a digital video camera) having a telecentric lens (502) (see FIG. 6). At this time, it is convenient to superimpose and display a line segment (506) indicating the horizontal direction and/or the vertical direction together with the imaged cell (4) on the monitor (504). For example, by rotating the cylindrical workpiece (1) while observing the direction of the cell (4) on the monitor (504), it is possible to adjust the position of the hole (5) such that the position of the hole (5) is located at the top of the side surface. The use of a camera having a telecentric lens has the advantage that the orientation of the cells can be adjusted more precisely, since distortion is eliminated.

When an image of the cell of the cylindrical workpiece is taken by a camera, it is preferable to take an image from a direction perpendicular to the bottom surface of the cylindrical workpiece to prevent distortion. Therefore, when imaging the cylindrical workpiece (1) with the camera (502), the pedestal (110) is preferably placed on an elevator (508) such as a jack to be movable in the vertical direction so that different portions can be imaged. In this way, it is possible to image different height positions of the cylindrical workpiece (1) without moving the camera (502). The elevator (508) is preferably configured to be controllable in position by a controller (509), preferably a remote controller. After clarifying the position reference of the hole (5), the camera (502) having a telecentric lens captures an image of the hole (5) opened in the side surface of the cylindrical workpiece (1) from vertically above, and thus inspection items can be inspected.

Figure 8:
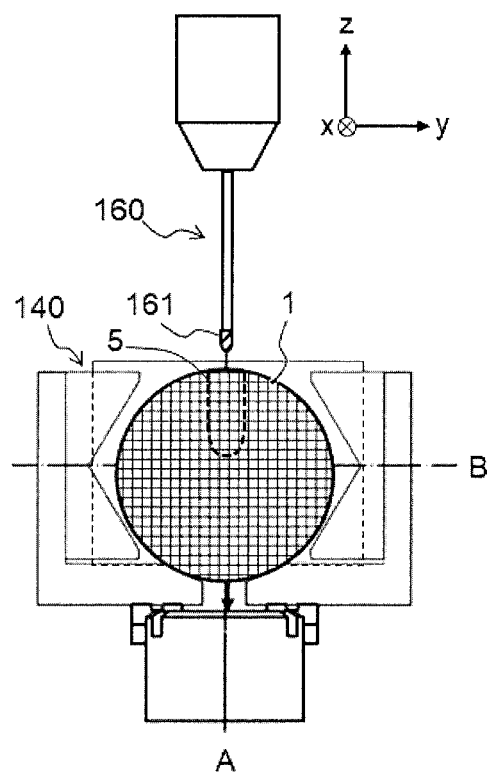
FIG. 8 is a schematic front view for explaining a method for inspecting a hole position using a three-dimensional coordinate measuring machine.

As another method for inspecting the cylindrical workpiece after the above-described perforating method is performed, there is a method of inspecting a hole position using a three-dimensional coordinate measuring machine equipped with a touch probe. FIG. 8 is a schematic view for explaining a hole position inspection method using the three-dimensional coordinate measuring machine (160). In the illustrated embodiment, the three-dimensional coordinate measuring machine (160) has a touch probe (161) that can be controlled to move in xyz directions (x direction is the direction in which the groove extends, y direction is the moving direction of the chuck, and z direction is the vertical direction).) Is provided at the tip, and the three-dimensional coordinate position can be specified when the touch probe (161) touches the object. By using the three-dimensional coordinate measuring machine (160), for example, it is possible to measure the depth of the hole (5) opened in the side surface of the cylindrical workpiece (1) by the following procedure. First, the touch probe (161) is applied to the side surface of the cylindrical workpiece (1) slightly shifted in the x-axis direction from the position of the hole of the cylindrical workpiece (1), and the coordinates of the position are recorded. Next, the touch probe (161) is applied to the deepest portion at the center of the hole (5), and the coordinates of the place are recorded. The depth of the hole (5) can be inspected by measuring the distance between the two coordinates in the z-axis direction.

DESCRIPTION OF REFERENCE NUMERALS

1 Cylindrical workpiece
2 Side surface
3 Partition wall
4 Cell
5 Hole
100 Perforating apparatus
110 Cradle
111 Reference surface
112 Groove
120 Stopper
122 Vise
130 Drill
132 Drill bit
140 Chuck
142a, 142b Gripper
144a, 144b Inclined surface
146 Chuck body
147a, 147b Finger
148 End plate
149a Piston
149b Cam
150 Controller
160 3D coordinate measuring machine
161 Touch probe
502 Camera
504 Monitor
506 Line segments representing horizontal and/or vertical directions
508 Elevator
509 Controller

The invention claimed is:

1. A perforating apparatus for a cylindrical workpiece, comprising:
a cradle having a center and a groove extending longitudinally in one direction horizontally from one end to another end;
a stopper provided at the one end of the groove;
a drill disposed vertically above the groove in the cradle and the drill is movable at least in a vertical direction, with the drill having a drill bit that extends in the vertical direction;
the cradle comprises a horizontal reference surface that extends along a horizontal plane that is perpendicular to the vertical direction in which the drill is movable, a vertical reference surface that extends along the center of the cradle in the vertical direction in which the drill is movable, and the groove has an inclined surface, which has a continuous slope, that is directly connected to each of the horizontal reference surface and the vertical reference surface along the center of the cradle, each of the horizontal reference surface, the vertical reference surface and the inclined surface of the groove extend from the one end to the other end of the cradle, the inclined surface of the groove is recessed below the horizontal reference surface; and
a chuck having a pair of opposing grippers movable toward each other in a respective direction perpendicular to the direction in which the groove extends, and the pair of opposing grippers are movable symmetrically with respect to a rotation axis of the drill bit, with each of the grippers further having a pair of vertically symmetric inclined surfaces extending upwards and downwards forming a recess;
wherein the cradle is movable, respectively, with each of the grippers;
wherein an inclination of the inclined surface of the groove is less than an inclination of the vertically symmetric inclined surfaces of each of the pair of opposing grippers relative to the horizontal reference surface;
wherein the horizontal reference surface extends towards the center of the cradle beyond each respective gripper of the pair of opposing grippers in a respective direction towards the vertical reference surface.

2. The perforating apparatus according to claim 1, wherein the stopper has a wall surface perpendicular to the direction in which the groove extends.

3. The perforating apparatus according to claim 1, wherein the drill is movable in the direction in which the groove extends.

4. The perforating apparatus according to claim 1, comprising:
a detector capable of detecting a point in time when the drill bit comes into contact with the workpiece by a change in a main spindle load on the drill bit; and
a controller configured to instruct the drill to perform perforation at a predetermined depth using the contact of the drill with the workpiece as a trigger.

5. The perforating apparatus according to claim 1, wherein when observed from the direction in which the groove extends, the contour shape of the groove is V-shaped, U-shaped, arc-shaped, or a part of any of these shapes.

6. The perforating apparatus according to claim 1, wherein when observed from a longitudinal direction of the groove, the pair of the inclined surfaces of each of the grippers is V-shaped.

7. The perforating apparatus according to claim 1, wherein the cradle is divided into two parts with the groove in between, and wherein a first part of the cradle is fixed to one gripper of the pair of opposing grippers and a second part of the cradle is fixed to the other gripper of the pair of opposing grippers.

\* \* \* \* \*